United States Patent [19]

Harima

[11] 4,027,047

[45] May 31, 1977

[54] PROCESS OF PRODUCING HYGIENICALLY WRAPPED, PRINTED AND MOLDED CHOCOLATE CAKES IN ENVELOPES SIMULTANEOUSLY FUNCTIONING AS DISPLAY COVERS

[75] Inventor: Kyujiro Harima, Osaka, Japan

[73] Assignee: Sisco Co. Ltd., Osaka, Japan

[22] Filed: Nov. 21, 1974

[21] Appl. No.: 525,875

Related U.S. Application Data

[63] Continuation-in-part of Ser. No. 295,096, Oct. 5, 1972, abandoned.

[52] U.S. Cl. .............................. 426/383; 426/414; 426/421
[51] Int. Cl.² ...................... B65B 9/00; A23P 1/00
[58] Field of Search .................. 426/414, 383, 414

[56] References Cited

UNITED STATES PATENTS

| | | | |
|---|---|---|---|
| 2,163,579 | 6/1939 | Bianchi | 426/390 |
| 2,235,964 | 3/1941 | Meyer et al. | 249/61 |
| 2,425,431 | 8/1947 | Le Vangie | 426/103 |
| 2,911,304 | 11/1959 | Wenger | 426/249 |
| 3,054,679 | 9/1962 | Bradford | 426/123 |
| 3,264,115 | 8/1966 | Davis | 426/75 |
| 3,410,699 | 11/1968 | Peters | 426/104 |

Primary Examiner—Raymond N. Jones
Attorney, Agent, or Firm—Otto John Munz

[57] ABSTRACT

A process of mass producing a plurality of wrapped, printed, hygienically molded chocolate cakes by advancing a continuously fed elongated plastic film strip in a sequence of steps in a plurality of spaced identical pattern areas, printing in each area, forming a mold with said areas in the bottom thereof followed by filling, cooling and sealing the filled mold.

3 Claims, 12 Drawing Figures

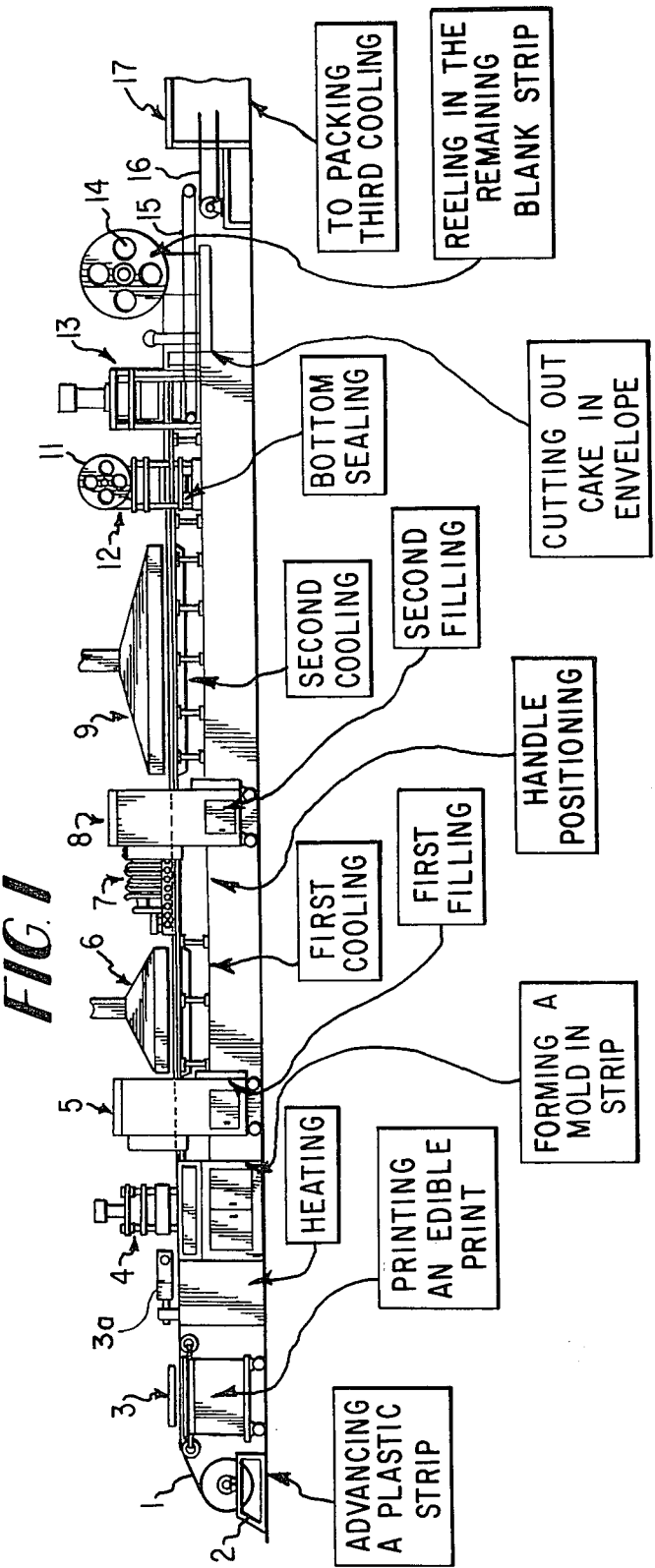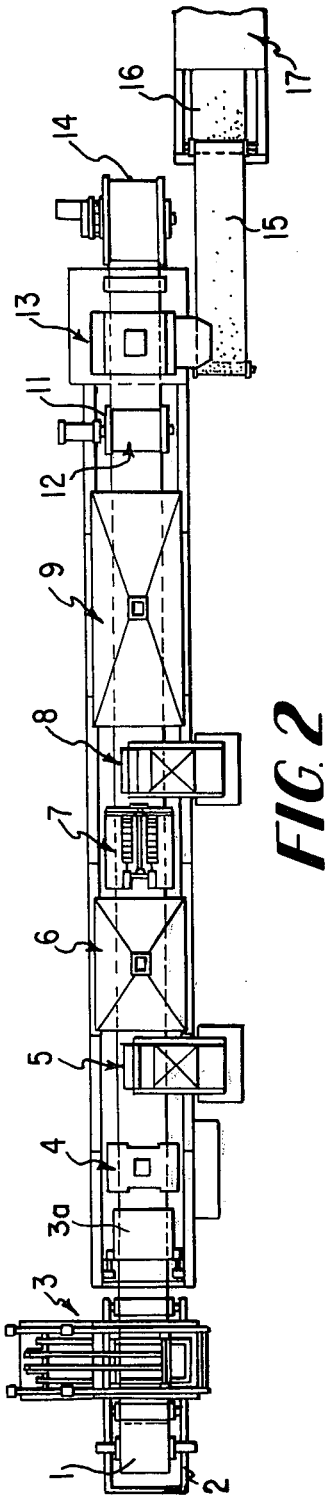

PROCESS OF PRODUCING HYGIENICALLY WRAPPED, PRINTED AND MOLDED CHOCOLATE CAKES IN ENVELOPES SIMULTANEOUSLY FUNCTIONING AS DISPLAY COVERS

CROSS REFERENCE TO RELATED APPLICATIONS

Priority of corresponding Japanese Patent application, No. 61.988/72, filed June 21, 1972 and a continuation-in-part of patent application Ser. No. 295,096, filed Oct. 5, 1972, now abandoned, are claimed for all subject matter common with them.

FIELD OF THE INVENTION

Molding of chocolate cakes in envelopes.

DESCRIPTION OF THE PRIOR ART

The prior art is represented by U.S. Pat. Nos. 2,163,579 to Bianchi, dated June 27, 1939, 2,911,304 to Wenger, dated Nov. 3, 1959, and 3,054,679 to Bradford, dated Sept. 18, 1962.

The prior art did not develop or suggest a process of mass producing hygienically molded wrapped and printed chocolate cakes, manually untouched, in a plastic film functioning simultaneously, during the process as a print carrier and mold for each individual cake and at completion of the process as a display cover and air-free envelope for each cake.

THE OBJECTS OF THE INVENTION

The primary object of the invention is:

to provide an automatic process for the manufacture of chocolate cakes in plastic display covers, simultaneously functioning also as envelopes, untouched by human hands, hygienically molded, printed and wrapped in top and bottom plastic strips and thereafter cut out from them.

Another object of the invention is to provide the process mentioned, including steps for the simultaneous removal for reprocessing of the unused blank portions of the strips after the enveloped cake has been cut out and to prevent interference of the unused portions of the strips with the subsequent steps of making the cakes.

Yet another object of the invention is to provide an apparatus capable of performing the several steps of this invention automatically in timed sequence of progressing steps in equidistantly spaced stations, each respective different step to be performed simultaneously on a different cake in succession of their progress.

Other objects of the invention will become apparent to those skilled in the art from the following description taken in conjunction with the appended drawings.

BRIEF DESCRIPTION OF THE DRAWINGS

FIG. 1 is a side view of the apparatus for manufacturing the chocolate cakes of the present invention;

FIG. 2 is a plan view of the device of FIG. 1;

DESCRIPTION OF THE PREFERRED EMBODIMENTS

Figure 3:
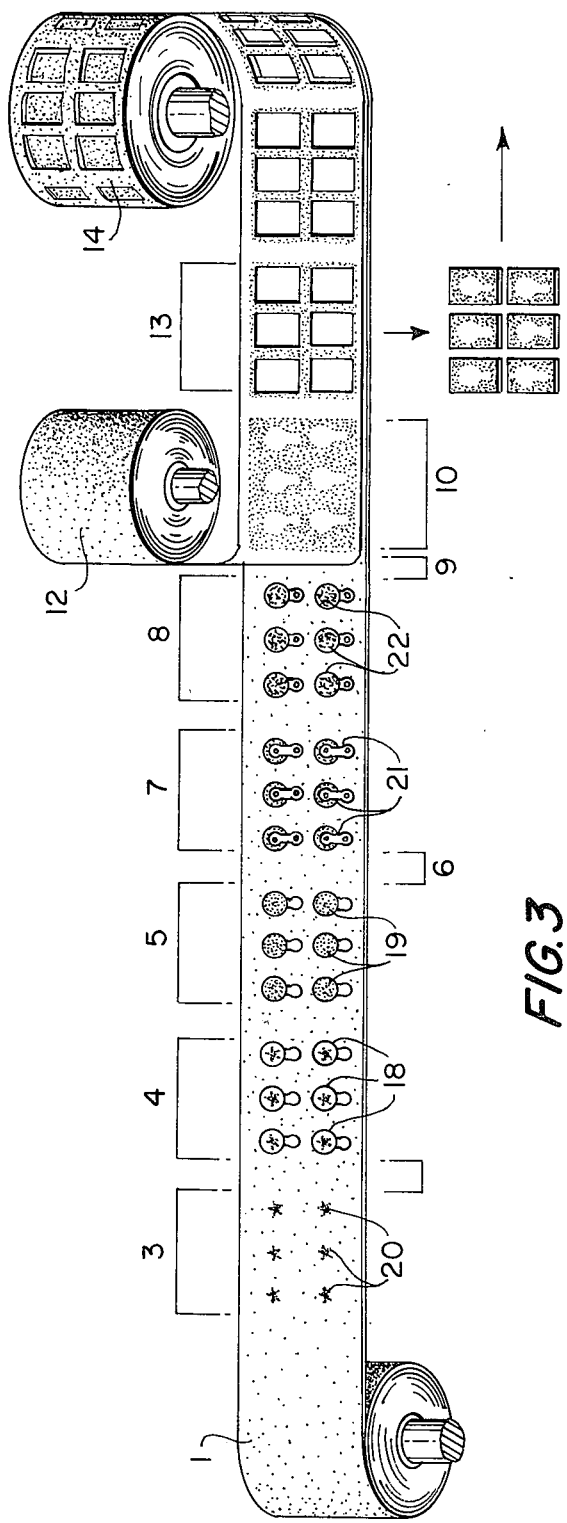
FIG. 3 is a diagrammatic view partly in perspective of a continuous plastic strip as it is advanced for printing, the production of the mold and part of future envelopes of the cakes in equal-sized areas of patterns, through a sequence of operational steps.

Referring to the drawings, a plastic film 1 preferably wound on a reel supported in a holder 2 is advanced in sequence through a printer stage 3, a mold forming stage 4, a first chocolate filling stage 5, a first cooling device 6, a feeder 7 of a handle, a second filling stage 8, a second cooling device 9, a sealing stage 10 and a cutter 13, which cuts out the cake with the handle, as they are enveloped between the top and bottom strips into the final product.

The envelope containing the cake with the handle is transferred by an endless conveyor belt 15, which has its receiving end positioned under the cutter to an endless conveyor belt 16 which transports the completed discrete packages through a final cooling stage 17 for the customary carton packing, or similar packaging device.

The top strip still retaining its continuous shape, with blanks for the cut-out areas after the enveloped cakes have been cut out therefrom, is reeled off unto reel 14 for reprocessing of the plastic material without waste thereof, the plastic material employed, such as collagen or gelatin, being non-toxic and often expensive.

Polyethylene film is acceptable for this purpose, because its smooth surface does not affect the chocolate.

The bottom seal 12 is provided preferably by a non-toxic continuous bottom sealing strip, at the sealing stage running from a feed reel 11 either underneath the bottom of the cake parallel therewith, or horizontally in a direction perpendicular to that of the advancing top strip with a separate cutter of the bottom seal.

The sealing and the cutting stages may be combined for simultaneous cutting of both the top and the bottom strips at stage 13 by the same cutter.

In the alternative, other sealing means are employed, such as spraying the bottom of the cake with non-toxic sealing material, such as gelatin or collagen, or by a non-toxic adhesive pressed against the bottom of the mold.

In the alternative the bottom strips may be thermoplastic and the bottom of the mold sealed by hot-pressing the strip to the edges of a thermoplastic mold.

Figure 4:
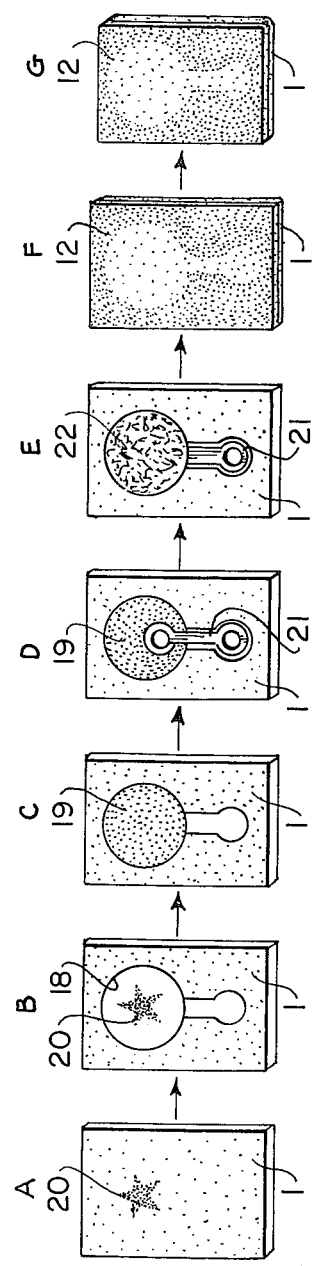
FIGS. 4A to E are plan views of a progressing sequence of stages of the pattern areas as the end product seen from the top is gradually formed and FIGS. 4F and G show an individual completed package as seen from the bottom.

As shown on FIGS. 1 to 4 the top strip which is preferably transparent and made of thermoplastic non-toxic material is printed on its top surface as viewed upon FIG. 1, in the printing stage 3 with an edible ink with a print 20 (shown on FIGS. 4A and 4B.

Figure 5:
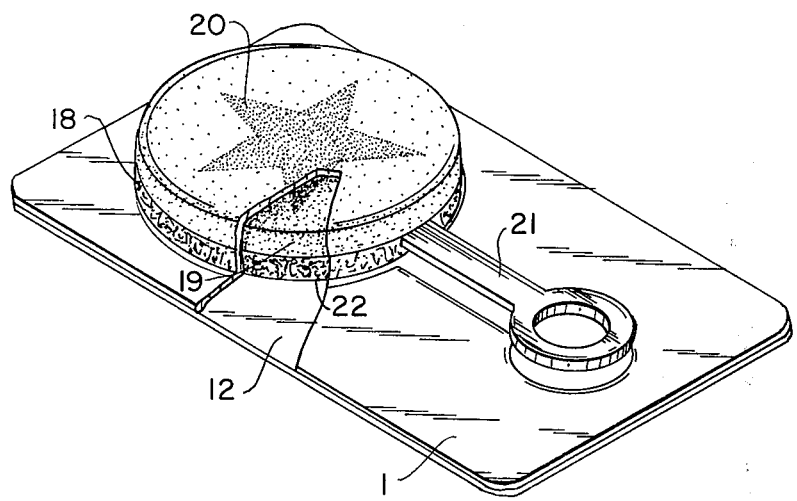
FIG. 5 is a perspective view of the end product with parts of the envelope broken away.
Figure 6:
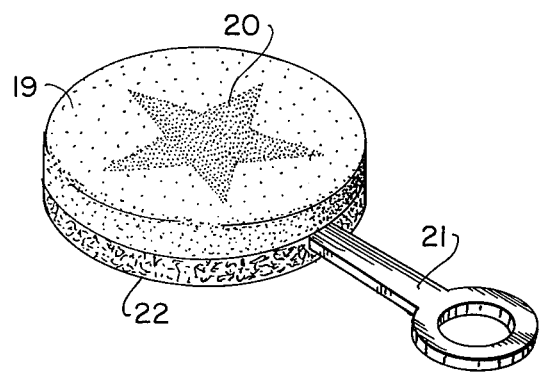
FIG. 6 is a perspective view of the chocolate cake removed from the envelope for immediate consumption.

The strip, either already preheated at stage 1, or preheated at stage 3a, is provided with a mold 18 (shown on FIG. 4B and 5) as it passes through the mold-forming stage 4 by pressing it into a die.

Other conventional methods of providing a mold in a thermoplastic film, such as by suction, or the blister molding method may be substituted.

Subsequently the mold is advanced to the first filling station 5, where it is supplied with a shot of liquid chocolate-including mass 19. The surface of the cake mass, adjacent to the print 20 previously printed on the bottom of the mold adheres to the print which thus becomes a part of the edible cake. For this purpose the edible ink may be a mixture with an edible adhesive. The printed cake thereafter is cooled in its mold in the cooler 6, advanced to the handle positioning station 7 where a part of a handle 21 is inserted into the mold on the chocolate layer leaving the remaining part exposed for manual grasping. During the further progress the mold stops at the second filling station 8, where it is supplied with a second shot of a molten chocolate mass, preferably having a taste different from that of the mass firstly deposited. The second shot of chocolate forms a layer 22 over the layer 19, simultaneously encasing a portion of the handle in-between. Thereafter the mold is cooled at stage 9 and sealed at stage 12. Finally the molds filled with chocolate cakes are separated by cutting them out of the strips, with their handles, by the cutter 13, and are dropped on the conveyor 15, and transferred by conveyor 16 into the final cooler 17.

The sequence of the several steps described proceeds in staccato timing, the stages being equidistantly spaced, each simultaneously to perform its own operation on a different pattern area.

What is claimed is:

1. A process of mass-producing a plurality of wrapped, printed, hygienically molded chocolate edible cakes with a continuously advanced top plastic film strip simultaneously functioning during the process as a print carrier and mold for each said cake, and at completion of the process as a display cover and envelope for each said cake, comprising the steps of:
    A. advancing a continuously fed elongated plastic film strip to be subjected to a sequence of steps in a plurality of spaced identical areas to be printed, each said area having the approximate width of an individual cake in its future envelope;
    B. printing on said film on each of said areas, with an edible ink, a pattern located in registration with the area of each individual cake subsequently deposited thereover;
    C. forming in the film strip a mold for each cake to include each of the patterns printed on the film strip, respectively;
    D. depositing into each said mold a fluid congealable edible chocolate mass which is adhesive to the pattern thus printed; positioning a handle into and partly protruding from said edible mass in each mold;
    E. cooling the mold to congeal the mass with the printed pattern attached; thereby forming an individual cake,
    F. sealing the open exposed side of each said mold to thus completely envelope each said cake; and
    G. cutting from the advancing strip, each mold with its cake sealed therewithin to form discrete packages; each discrete sealed package including the protruding portion of its respective handle.

2. The process as claimed in claim 1, further comprising the steps interposed between the steps (E) and (F) of claim 1 of:
    H. depositing upon the cooled, congealed mass, a handle partly protruding from the mass;
    I. depositing upon the mass and over the handle part superposed thereover a second mass of a fluid congealable edible material, and
    J. cooling and congealing the superposed edible masses, with the handle part interposed therebetween.

3. The process of mass-producing a plurality of sealed packages each containing an edible hygienic chocolate mass, comprising:
    advancing a moldable plastic film to and past a plurality of sequential stations;
    at a first said station printing on the film with edible ink a multiplicity of spaced patterns each for a respective package,
    at a second station heating the advancing film to render the same moldable,
    at a third station deforming the heated film to form therein a multiplicity of molds each including in its cavity a respective printed pattern,
    at a fourth station depositing into each mold, into contact with the pattern therein, a flowable edible, congealable first chocolate mass,
    at a fifth station cooling the edible masses to congeal the same with its pattern adhesive thereto,
    at a sixth station sealing the otherwise open top of each mold with congealed mass therein,
    at a seventh station cutting out the film in a closed line about each mold to thus form discrete packages,
    each mold being only partially filled with said first mass at said fourth station, and sequentially between said fifth and sixth stations and in the order mentioned,
    depositing into each mold a handle partly superposed over and partly projecting from the first mass therein,
    depositing a second flowable, edible, congealable chocolate mass into each mold, over the first mass therein and its superposed handle part, and
    cooling the masses in each mold to congeal and unite the same with its handle part interposed, said sealing at said sixth station being effected by applying over the film an elongated strip adhesive thereto, to seal the otherwise open top of each mold with its contained mass and handle, each handle being completely sealed by the strip, within its mold.

* * * * *